US010136443B2

(12) United States Patent
Lakshmi Narayanan et al.

(10) Patent No.: US 10,136,443 B2
(45) Date of Patent: Nov. 20, 2018

(54) MECHANISM AND APPARATUS TO PERFORM COOPERATIVE RESOURCE MANAGEMENT IN WIRELESS NETWORKS (71) Applicant: NOKIA SOLUTIONS AND NETWORKS OY, Espoo (FI)

(72) Inventors: Ram Lakshmi Narayanan, Pleasanton, CA (US); Anuj Kaul, Santa Clara, CA (US); Yinghua Ye, Santa Clara, CA (US); Mili Shah, Sunnyvale, CA (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 13 days.

(21) Appl. No.: 14/426,830

(22) PCT Filed: Sep. 6, 2013

(86) PCT No.: PCT/EP2013/068440
§ 371 (c)(1),
(2) Date: Mar. 9, 2015

(87) PCT Pub. No.: WO2014/037487
PCT Pub. Date: Mar. 13, 2014

(65) Prior Publication Data
US 2015/0223255 A1 Aug. 6, 2015

Related U.S. Application Data (60) Provisional application No. 61/698,031, filed on Sep. 7, 2012.

(51) Int. Cl.
*H04L 12/853* (2013.01)
*H04L 12/911* (2013.01)
(Continued)

(52) U.S. Cl.
CPC ......... *H04W 72/0493* (2013.01); *H04L 47/28* (2013.01); *H04L 47/826* (2013.01);
(Continued)

(58) Field of Classification Search
None
See application file for complete search history.

(56) References Cited

U.S. PATENT DOCUMENTS 5,832,232 A    11/1998   Danneels
7,707,485 B2 *   4/2010   Laksono ............ H04N 21/4345
                                                                          715/201
(Continued)

FOREIGN PATENT DOCUMENTS

WO   WO 2004/002130 A2     12/2003
WO   WO 2004002130 A2 * 12/2003 ............ H04N 21/238
WO   WO 2010045109 A1 * 4/2010 ............ H04L 65/608

OTHER PUBLICATIONS

International Search Report and Written Opinion dated Nov. 11, 2013 corresponding to International Patent Application No. PCT/EP2013/068440.

(Continued)

Primary Examiner — Ayaz R Sheikh
Assistant Examiner — Tarell A Hampton
(74) Attorney, Agent, or Firm — Squire Patton Boggs (US) LLP (57) ABSTRACT

Various systems and devices may benefit from cooperative resources management. For example, third and fourth generation wireless networks may benefit from a mechanism and apparatus to perform cooperative resource management, for example, for video downloads. Various methods are possible. For example, a method can include regulating fill and drain phases for a downloading session, to meet just in time delivery. The regulating can be performed by a user (Continued)

equipment based on parameters provided by a network. Another method can include providing parameters to a user equipment and instructing the user equipment with respect to regulating fill and drain phases for a downloading session, to meet just in time delivery, based on the parameters. A further method can include performing a mutual handshake between an application and a radio network regarding just in time delivery of a download.

23 Claims, 7 Drawing Sheets

(51) Int. Cl.
*H04W 72/04* (2009.01)
*H04L 12/841* (2013.01)
*H04L 29/08* (2006.01)
*H04W 80/06* (2009.01)
*H04L 12/801* (2013.01)

(52) U.S. Cl.
CPC ............ *H04L 67/06* (2013.01); *H04W 80/06* (2013.01); *H04L 47/14* (2013.01); *H04L 47/2416* (2013.01); *H04L 47/822* (2013.01); *H04L 47/824* (2013.01); *H04L 67/32* (2013.01)

(56) References Cited

U.S. PATENT DOCUMENTS

| | | | | |
|---|---|---|---|---|
| 2003/0009762 | A1* | 1/2003 | Hooper ................. | G06Q 30/02 725/91 |
| 2003/0069963 | A1* | 4/2003 | Jayant ............... | H04L 29/06027 709/224 |
| 2003/0125037 | A1* | 7/2003 | Bae ...................... | H04W 28/22 455/450 |
| 2003/0154272 | A1* | 8/2003 | Dillon ..................... | H04L 47/10 709/223 |
| 2004/0203796 | A1* | 10/2004 | Dunlop .............. | H04L 41/0896 455/445 |
| 2006/0047775 | A1* | 3/2006 | Bruck ................. | H04N 7/17318 709/217 |
| 2007/0028142 | A1* | 2/2007 | Elsner .................. | H04L 43/045 714/25 |
| 2007/0213038 | A1* | 9/2007 | Masseroni ........ | H04L 29/06027 455/414.3 |
| 2008/0114889 | A1* | 5/2008 | Deshpande ........ | H04N 21/2343 709/231 |
| 2009/0201813 | A1* | 8/2009 | Speight ................ | H04W 80/06 370/235 |
| 2010/0121977 | A1* | 5/2010 | Kontola ................ | H04L 1/0002 709/232 |
| 2010/0217888 | A1* | 8/2010 | Ukita ...................... | H04L 47/12 709/234 |
| 2010/0319038 | A1* | 12/2010 | Devassykutty .... | H04N 7/17318 725/82 |
| 2011/0066673 | A1* | 3/2011 | Outlaw ............... | H04L 65/4092 709/203 |
| 2011/0087797 | A1* | 4/2011 | Costa .................... | H04L 65/605 709/232 |
| 2011/0106969 | A1* | 5/2011 | Choudhury ....... | H04N 21/41407 709/236 |
| 2011/0167170 | A1* | 7/2011 | Kovvali ................ | H04W 28/06 709/232 |
| 2011/0255535 | A1* | 10/2011 | Tinsman ................. | H04L 47/10 370/390 |
| 2011/0299586 | A1* | 12/2011 | Odlund ................... | H04L 65/00 375/240.01 |
| 2011/0320287 | A1* | 12/2011 | Holt ....................... | G06Q 30/00 705/14.73 |
| 2012/0064908 | A1* | 3/2012 | Fox ....................... | H04W 28/10 455/452.2 |
| 2012/0203886 | A1* | 8/2012 | Mavromatis ........ | H04L 41/0896 709/224 |
| 2012/0265847 | A1* | 10/2012 | Swenson ............. | H04L 65/1076 709/217 |
| 2014/0025837 | A1* | 1/2014 | Swenson ........... | H04L 29/06027 709/231 |
| 2014/0032719 | A1* | 1/2014 | Panwar ................. | H04L 65/607 709/219 |

OTHER PUBLICATIONS

Truong Cong Thang et al., "Video Streaming over HTTP with Dynamic Resource Prediction," Communications and Electronics (ICCE), 2012 Fourth International Conference on, IEEE; Aug. 1, 2012; pp. 130-135; XP032245507.
White Paper; "Cisco Visual Networking Index: Global Mobile Data Traffic Forecast Update, 2010-2015," Feb. 1, 2011, 27 pages.
3GPP TR 25.813 V7.1.0 (Sep. 2006), Technical Report, 3rd Generation Partnership Project; Technical Specification Group Radio Access Network; Evolved Universal Terrestrial Radio Access (E-UTRA) and Evolved Universal Terrestrial Radio Access Network (E-UTRAN); Radio interface protocol aspects (Release 7), Sep. 2006, 41 pages.
3GPP TS 36.331 V10.3.0 (Sep. 2011), Technical Specification, 3rd Generation Partnership Project; Technical Specification Group Radio Access Network; Evolved Universal Terrestrial Radio Access (E-UTRA); Radio Resource Control (RRC); Protocol specification (Release 10), Sep. 2011, 296 pages.
"Fast Dormancy and Battery," Samsung Galaxy 551 and more; Sep. 5, 2011, 1 page. Retrieved from https://galaxy551.wordpress.com/2011/09/05/fast-dormancy-and-battery/.
3GPP TR 25.903 V10.0.0 (Mar. 2011), Technical Report, 3rd Generation Partnership Project; Technical Specification Group Radio Access Network; Continuous connectivity for packet data users (Release 10), Mar. 2011, 138 pages.

* cited by examiner

MECHANISM AND APPARATUS TO PERFORM COOPERATIVE RESOURCE MANAGEMENT IN WIRELESS NETWORKS

CROSS-REFERENCE TO RELATED APPLICATION

The present application is related to and claims the benefit and priority of U.S. Provisional Patent Application No. 61/698,031 filed Sep. 7, 2012, which is hereby incorporated herein by reference in its entirety.

BACKGROUND

Field

Various systems and devices may benefit from cooperative resources management. For example, third and fourth generation wireless networks may benefit from a mechanism and apparatus to perform cooperative resource management, for example, for video downloads and for longer IP session flows.

Description of the Related Art

With the increasing popularity of smart phones and tablets, mobile data traffic may grow at a compound annual growth rate (CAGR) of 92 percent from 2010 to 2015, reaching 6.3 exabytes (1 exabyte is $10^{18}$ bytes) per month by 2015. Moreover, two-thirds of the world's mobile data traffic may be video by 2015.

Thus, operators, network vendors, and application service providers may need to come up with design and pricing models for handling controlled growth in internet traffic. This may especially be the case in mobile broadband, in which there is a constrained environment having scarce radio resources and user devices are constrained by battery and size limitations, for example.

Two factors that can be considered in mobile broadband with regard to data usage are signaling connection and data tonnage. The number of signaling connections that an application requires over the period of time impacts radio network scalability. Data tonnage occupies network resources for time needed for data to be transported and this demands additional capacity. Coordination between network and application may be useful in order to minimize data signaling and maximize the network scalability.

A large amount of the video data in a network may be the result of a small fraction of the http requests received from users. For example, 60% of video data volume may be generated by 2% of http requests received from the users, in a particular case.

The YouTube® service provided by Google, Inc. is an example of one popular video data service. YouTube® service currently uses a technique called progressive download, in which the video service is stored as a file at content delivery networks (CDNs) and delivered to the users upon requests. The client application can start playing video to the user after receiving a portion of the file content. The video can be delivered using hyper-text transfer protocol (HTTP) so that it works across many networks.

Figure 1:
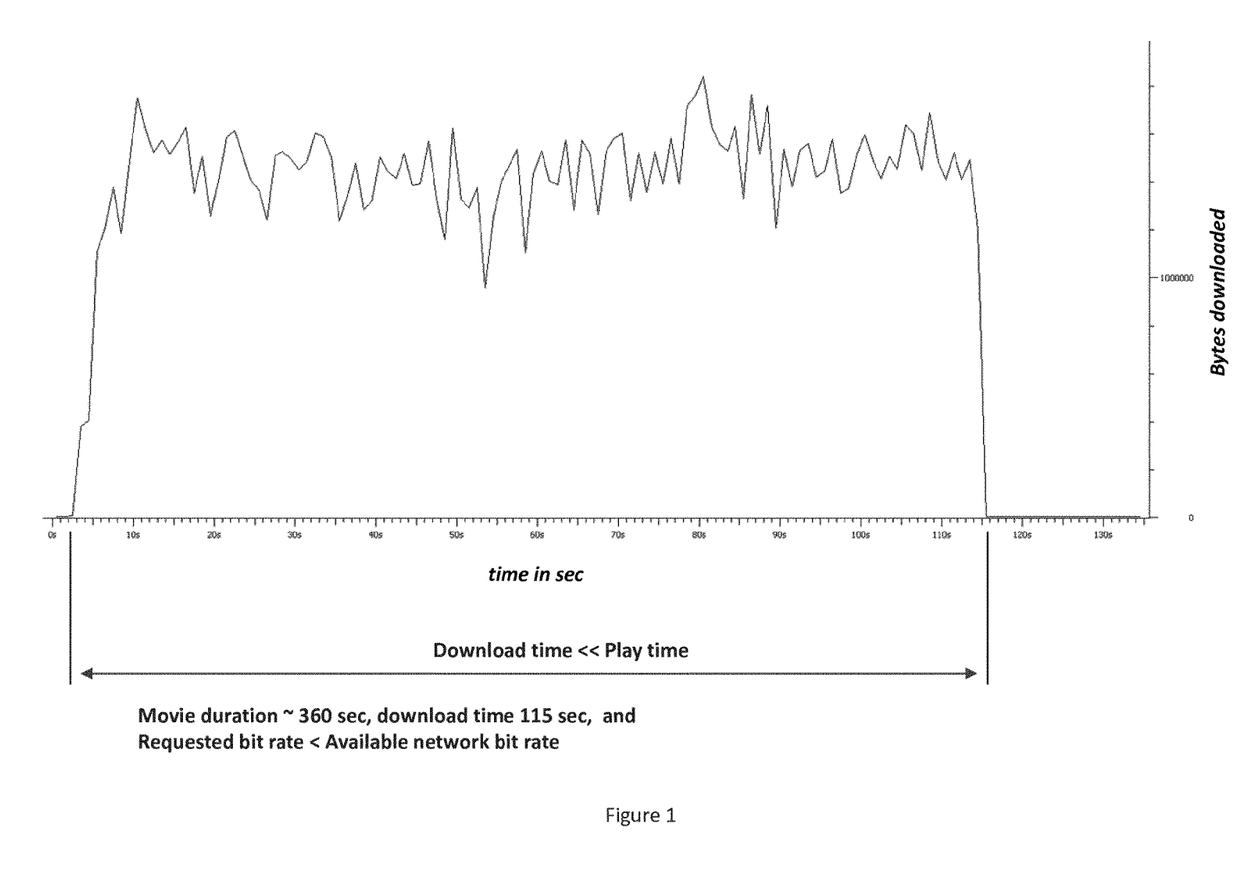
FIG. 1 illustrates a network trace of observed network traffic during the download of a video using HTTP.

FIG. 1 illustrates a network trace of observed network traffic during the download of a video using HTTP. As shown in FIG. 1, the download time may be significantly shorter than the play time and a requested bit rate may be less than an available network bit rate. Thus, for example, a 360 second video clip may be downloaded in 115 seconds.

As the video is delivered over third generation and fourth generation (3G/4G) network systems, user terminals and the wireless network may have resource constrained environments that include such factors as battery, radio resources, and the like. However, conventional video protocols and delivery techniques do not consider these constraints as part of their design.

Moreover, lack of cooperation between application and wireless networks can lead to uneven load on a network, in terms of radio signaling and data wastage.

As mentioned above, FIG. 1 presents a trace that may be observed in a 3G/4G network, wherein the entire movie gets downloaded quickly. For video application, if data is made available early at the client, it may not have benefit to the client, because the client application will not consume the data immediately. The client application may only consume the data when video watching time has nearly approached. Additionally, if the user or subscriber of the client has a change of mind and prematurely terminates the video session, then most of the downloaded data may be wasted.

Thus, various side-effects may be observed in mobile network video delivery. Radio resource is a scare resource. Data wastage not only impacts user equipment (UE) battery life, but also imposes unnecessary traffic on the radio interface.

In another example, radio channels are limited. Because there is no idle time during video download in the example of FIG. 1, the number of concurrent sessions for video traffic may be limited, which may also limit network scalability. Likewise, there is no idle time observed in the network in FIG. 1. Once the video is requested by the user, the data keeps constantly flowing and results in no idle time.

In 3G/4G networks, Fast Dormancy, CELL PCH, and Continuous Packet Connectivity (CPC) aim to increase the efficiency of the radio resources. The assumption of these approaches is that application traffic is transactional, the traffic observed in the network either looks like a request/response or comes in short burst interval, and idle time is longer or comparable to active time. These approaches, however, cannot be applied to video traffic whether there is either no burst interval observed, or the burst interval has a long duration.

Additionally, video optimizers can be deployed in the network edge with a goal of throttling video traffic and minimizing bandwidth. These approaches do not scale well when more than 40% of the video traffic needs to be optimized. Moreover, in these approaches there is no coordination between radio signaling and throttling on the core network.

SUMMARY

According to a first embodiment, a method includes regulating fill and drain phases for a downloading session, to meet just in time delivery. The regulating can be performed by a user equipment based on parameters provided by a network.

According to a second embodiment, a method includes providing parameters to a user equipment and instructing the user equipment with respect to regulating fill and drain phases for a downloading session, to meet just in time delivery, based on the parameters.

According to a third embodiment, a method includes performing a mutual handshake between an application and a radio network regarding just in time delivery of a download.

The method can further include providing a requested bit rate to the radio network and/or receiving the requested bit rate from the application.

The method can additionally include providing a time quantum and a variation parameter in response to the requested bit rate from the radio network and/or receiving the time quantum and the variation parameter from the radio network at the application.

The method can further include combining at least any two of available bandwidth, location of the user equipment, and historical information about throughput based on time or location, wherein just in time delivery is based on the combination.

The method can additionally include throttling a transmission control protocol (TCP) window based on a video duration and available users on a network. The throttling can be performed directly at the user equipment.

The method can also include the application computing how much data and time are required for downloading for a given bit rate, and determining appropriate network level parameters based on the computing. The network level parameters can include available bandwidth, requested bandwidth, and duration of access.

The method can include the application obtaining video parameters from metadata downloaded from a video server.

The method can further include forwarding the video parameters to the network.

The method can additionally include the network deciding parameters including scheduling on time of radio resource or available network bandwidth for a video application.

The method can also include sending a message from the application to the network, wherein the message is configured to prompt the network to adjust a time quantum value.

According to fourth, fifth, and sixth embodiments, an apparatus can include a processor and a memory including computer program code, wherein the memory and the computer program code are configured to, with the at least one processor, cause that apparatus to perform the method according to the respective first, second, and third embodiments, in all their variants.

According to seventh, eighth, and ninth embodiments, a non-transitory computer-readable medium may be encoded with instructions that, when executed in hardware perform the method according to the respective first, second, and third embodiments, in all their variants.

According to a tenth embodiment, an apparatus includes regulating means for regulating fill and drain phases for a downloading session, to meet just in time delivery. The regulating can be performed by a user equipment based on parameters provided by a network.

According to an eleventh embodiment, an apparatus includes control means for providing parameters to a user equipment and instructing the user equipment with respect to regulating fill and drain phases for a downloading session, to meet just in time delivery, based on the parameters.

According to a twelfth embodiment, an apparatus includes handshake means for performing a mutual handshake between an application and a radio network regarding just in time delivery of a download.

The apparatus can further include bit rate means for providing a requested bit rate to the radio network and/or receiving the requested bit rate from the application.

The apparatus can additionally include parameter means for providing a time quantum and a variation parameter in response to the requested bit rate from the radio network and/or receiving the time quantum and the variation parameter from the radio network at the application.

The apparatus can further include combination means for combining at least any two of available bandwidth, location of the user equipment, and historical information about throughput based on time or location, wherein just in time delivery is based on the combination.

The apparatus can additionally include throttling means for throttling a transmission control protocol (TCP) window based on a video duration and available users on a network. The throttling can be performed directly at the user equipment.

The apparatus can also include computing means for computing how much data and time are required for downloading for a given bit rate, and for determining appropriate network level parameters based on the computing. The network level parameters can include available bandwidth, requested bandwidth, and duration of access.

The apparatus can include obtaining means for obtaining video parameters from metadata downloaded from a video server.

The apparatus can further include forwarding means for forwarding the video parameters to the network.

The apparatus can additionally include deciding means for deciding parameters including scheduling on time of radio resource or available network bandwidth for a video application.

The apparatus can also include sending means for sending a message from the application to the network, wherein the message is configured to prompt the network to adjust a time quantum value.

BRIEF DESCRIPTION OF THE DRAWINGS

For proper understanding of the invention, reference should be made to the accompanying drawings, wherein.

DETAILED DESCRIPTION

In this certain embodiments, video streaming implementation is provided as an example of how to build a cooperative resource management scheme in the network to minimize the radio signaling, and also to maximize the scalability of network. The described mechanisms can also be applied or extended to other similar implementations.

Thus, for example, certain embodiments permit a network to have a mutual handshake protocol mechanism with which applications, hence network friendly applications and application friendly networks are achieved.

Moreover, certain embodiments achieve just in time (JIT) delivery for video application by combining available bandwidth, location of the user equipment (UE), optional historical information about throughput based on time/location and the like, and throttle transmission control protocol (TCP) window based on the video duration and available users on the network.

Certain embodiments may work with various video delivery streaming techniques including progressive download (PD), dynamic adaptive streaming over HTTP (DASH), and other streaming services such as Pandora® of Pandora Media, Inc.

Additionally, certain embodiments may have direct savings on bandwidth by providing just in time delivery techniques in the last hop, and minimizing the wastage of data by incorporating throttling techniques directly on the UE and the radio network controller (RNC).

Furthermore, certain embodiments can leverage a video service such as YouTube® or HULU at the client to compute how much data and time is required for downloading for given bit rate. Such information may be used and translated to appropriate network level parameters, such as available bandwidth, requested bandwidth, duration of access to increase the radio network scalability.

According to certain embodiments, when an application knows how much data is to be downloaded and the required time, the application can work cooperatively with the network. Application level parameters can be translated to network level parameters, and fairness can be provided by the network. In the case of video service, the UE/client application can obtain video parameters from metadata that the UE downloads from the video server. The video parameters can include required bit rate, total duration of the video, and other video-related parameters. These parameters may be forwarded to the network, or translated by UE and send in common format that is understood by the network (such as required bandwidth, latency, throughput, time duration, or the like) and may help the network decide parameters such as scheduling ON time of radio resource, available network bandwidth for that application. Thus, the network can create idle time duration and intervals and can provide fairness to both video application and network.

Figure 2:
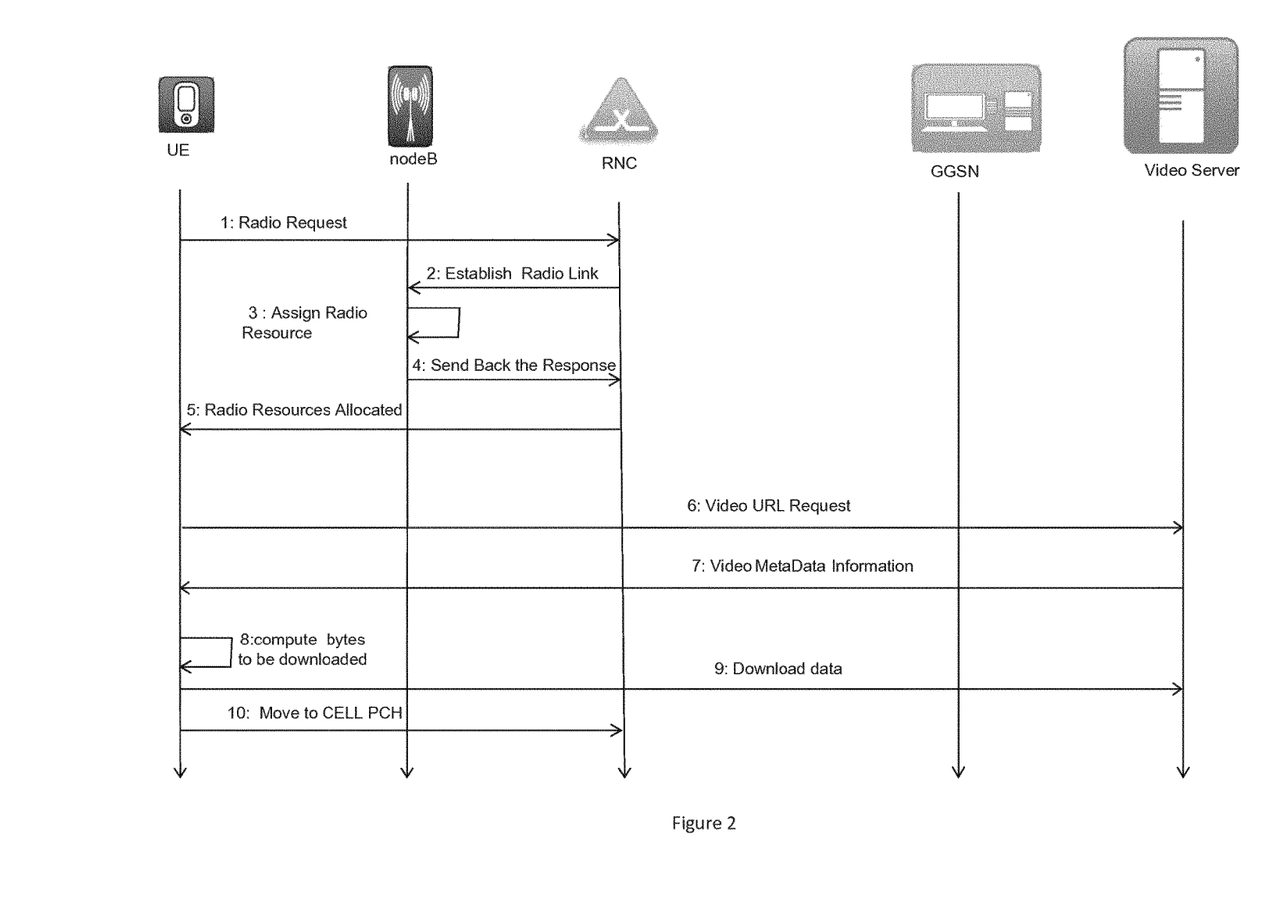
FIG. 2 illustrates a message flow according to certain embodiments.

In the following example embodiment, detailed message interactions between network elements are described with reference to FIG. 2. FIG. 2 illustrates a message flow according to certain embodiments.

As shown in FIG. 2, at (1), a subscriber who is attached to a cellular network may access a video service. The cellular network may, for example, be a third generation (3G) network. A user equipment (UE) of the subscriber can generate a radio resource request and direct it toward a radio network controller (RNC)

At (2), after receiving the radio resource request, the RNC can compute internally to check whether it can entertain new request. If so, then the RNC can request the NodeB to establish a radio link toward the UE. At (3), the NodeB can allocate the requested radio resources and, at (4), can respond to the RNC's request.

At (5), the radio network can compute current resource utilization including currently attached users (AU), congestion level (CL), and other radio level inputs received from NodeB to compute a time quantum $t_q$. Here, time quantum $t_q$ can refer to the duration that network expects the UE to be active in downloading the video data from the network. The radio network can then inform the UE about the allocated radio link resources (including throughput guidance), along with time quantum $t_q$ and the variation parameter α, which is described in FIG. 3A.

In order to create idle time between consecutive downloads, the network can create a time quantum value. The idle time here can be considered in term of duration and intervals. These values can be derived from the programmed radio state timers by combining values from DTX, DRX, RRC state machine timers. The network can expect that UE will download as much as possible within this time, based on the location of UE, radio conditions that the UE experience and available bandwidth provided by the network for that time quantum. The duration value can be computed based on multiple parameters including static and dynamic configuration, such as the number of users per transmission time interval (TTI), number of maximum resource block per user, discontinuous transmission (DTX) and discontinuous reception (DRX) timers, tail values of idle time timers when no data is seen on the link/channel, number of active users, aggregated bandwidth consumed by the users, and the like. Using the computed duration value, the radio network can compute a time quantum value that will allow enough idle time, and that will ensure that the required video data is downloaded in chunks with enough gaps, to achieve JIT.

In addition to the time quantum parameter, a variation parameter can also be defined as follows:

$$\alpha = \begin{cases} 0 = \text{No duty cycle} \\ 1 = \text{download only required data within time quatum} \\ 2 = \text{download until time quantum expires} \end{cases}$$

The UE can receive parameters of $t_q$ and α from the network, and can keep these parameters for the entire RRC session.

When α=0, there may be no just in time service provided, and the system can depend upon the UE and video server application to handle the downloading. This approach may provide backward compatibility to networks that do not support just in time features. In older systems this information element (IE) itself may not be present. Thus, a scenario can arise in which there is no coordination for just in time service. When α=1, the UE may be expected to implement fair policy network usage, and the network may expect that the UE will release the resource as soon as the required data is arrived. The UE does not, in this case, need to wait for the time quantum to elapse. When α=2, the network can request the UE to use the time quantum to the maximum possible, because the time quantum may be the maximum time variable that the UE can allocate for application service access.

At (6), the UE can generate a video request and send it toward the video server. At (7), the video server can send a response to the UE. This response can involve multiple messages being exchanged between the UE and the video server. During an initial message exchange, video metadata information can be downloaded and may be contained in the first few packets. This metadata can describe the video parameters, as illustrated, for example, in FIG. 3A.

At (8), upon receiving the metadata, the client application can compute the requested bit rate (RBR), total video duration (TVD), total download time (TDT), lower watermark for buffer (lWM), higher watermark for buffer (hWM), initial video start time (iST), and buffer length (bufflen). Bufflen may be equal to the maximum of iST and TVD-TDT. Moreover, the hWM may be twice bufflen. Thus, bufflen configuration may be based on a JIT parameter, which is a difference between ND and TDT. The buffer length can also be adjusted to be equal to that of TCP receiver window size, so that no excessive download is possible at lower layers.

There are several approaches by which this information can be extracted and passed to radio layers. As an example, in Android® of Google, Inc., the operating system can provide the video and audio service application program interface (API) to applications, and the operating system can maintain entire decoded parameters. The operating system can also have control over the radio resource control (RRC) protocol and device driver. The operating system can implicitly fill these values and pass them to the lower layer at the UE. In other architectures, such provisioning may be done within the application. The application can make use of quality of service (QoS) API/socket API services, and pass these values by using input/output control (IOCTL) calls and further radio layer protocol messages.

To achieve just in time service, the UE can download data from the video server based on following condition:

$$bytes\_downloaded = min(hWM, bytes\ downloaded\ in\ t_q)$$

At (9), the UE can download the requested video data, based on the following conditions. Namely, when $\alpha=0$, there is no just in time service, and the download conditions can depend on the UE and the video server application. When $\alpha=1$, the UE may be expected to implement fair policy network usage, and network may expect that the UE will release the resource as soon the required data is arrived. Then the requested bit rate is less than the available bandwidth, the UE may download only what is required for achieving just in time service, as illustrated in FIG. 4.

When $\alpha=2$, the network can request the UE to use the time quantum to maximum possible potential, because the time quantum may be the maximum time variable that the UE can allocate for application service access. In this scenario, the UE may be requested by the network to download as much as possible during that time quantum. This scenario may, for example, be applied only when the RNC is facing more signaling load.

Figure 4:
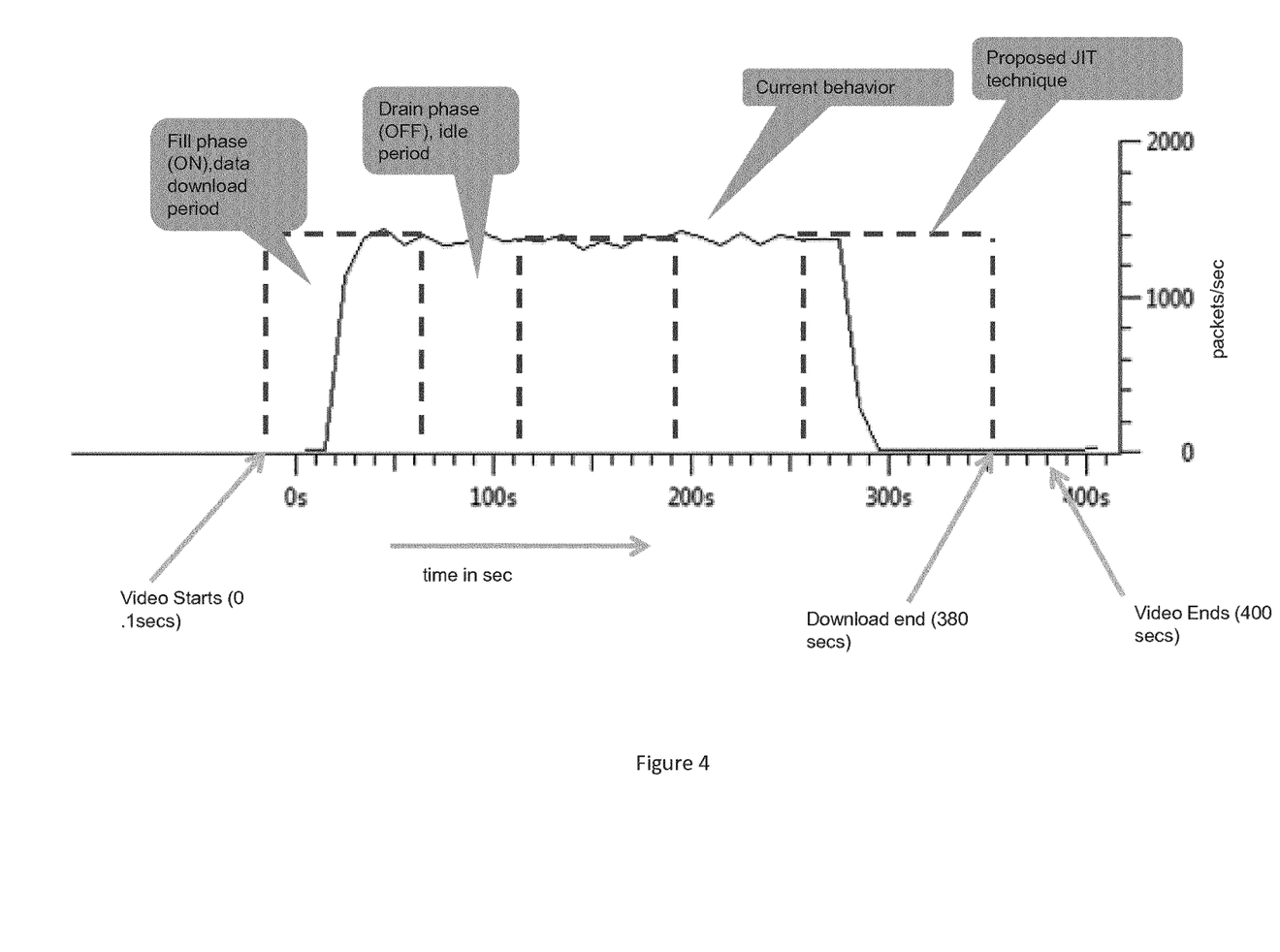
FIG. 4 illustrates just in time delivery according to certain embodiments.

At (10), after the UE has used the time quantum and created an ON cycle as illustrated in FIG. 4, it can move to CELL_PCH state, which can be an idle state in which the UE remains in RRC connected mode for an extended period of time. Complementary features such as CELL_PCH and fast dormancy techniques can be applied. If, for some reason, the video could not be downloaded and/or more data is required, a message indicating this error condition can be communicated to the network. The communication can take the form of a suggestion that the time quantum value needs to be adjusted. A revised value can be proposed by the UE for future scheduling. This feedback mechanism from UE enables the network to adjust the scheduling parameters.

When the video starts playing, the data in the buffer can be drained at a constant rate. When the buffer length is less than that of low watermarking, then the UE can initiate a radio resource allocation procedure again.

Figure 3A:
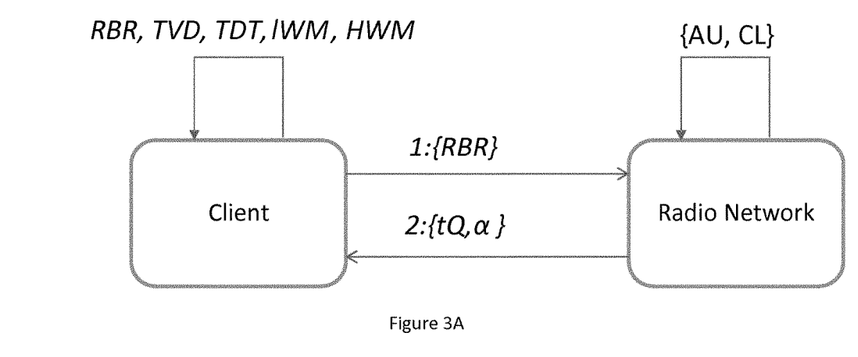
FIG. 3A illustrates parameter flows according to certain embodiments.

FIG. 3A illustrates parameter flows according to certain embodiments. As shown in FIG. 3A, at (1) a user equipment of a client can send a requested bit rate (RBR) to the radio network. The radio network can determine a number of attached users (AU), a congestion level (CL), and other radio level inputs, which may be received from a NodeB to compute a time quantum $t_q$, which can be sent at (2) to the client together with variation parameter $\alpha$. The client can generate total video duration (TVD), total download time (TDT), lower watermark for buffer (IWM), higher watermark for buffer (hWM) and so forth, as described above.

Figure 3B:
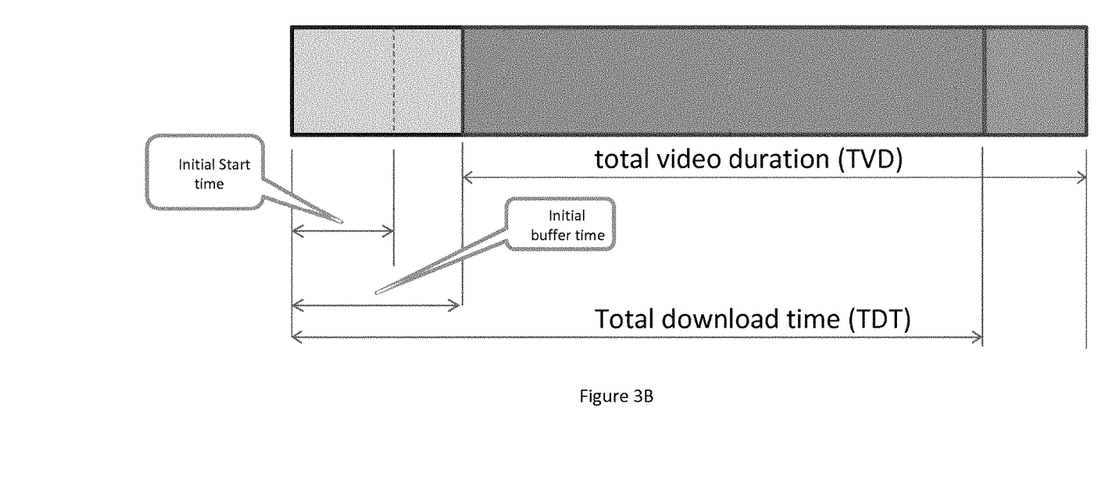
FIG. 3B illustrates the relations between parameters, according to certain embodiments.

FIG. 3B illustrates the relations between parameters, according to certain embodiments. As shown in FIG. 3B, the initial video start time (iST) may be shorter than the buffer length (buflen). Moreover, the total video duration (TVD) may be shorter or longer than the total download time (TDT), depending on a number of factors.

FIG. 4 illustrates just in time delivery according to certain embodiments. As shown in FIG. 4, a video can be downloaded using a series of fill phases and drain phases. The fill phases can be phases in which the user equipment downloads either as rapidly as possible or at some throttled rate. The drain phases can be periods where the user equipment is in idle mode.

As FIG. 4 shows, the resulting download may be spaced out over a longer time than in the current behavior. Thus, chunks of the video may be downloaded just in time, before they are to be played. For example, the chunks may be downloaded as much as twenty seconds before they are to be played, in the embodiment illustrated.

Various embodiments may provide certain benefits. For example, in certain embodiments a network can accumulate and negotiate with applications. Thus, network-friendly applications and application-friendly networks can be achieved. Moreover, in certain embodiments, just in time (JIT) delivery service can be achieved by combining available bandwidth, optional UE location, and historical information about throughput based on time/location. Other information can also be used, such as information about available users on the network.

Furthermore, certain embodiments can work with various video delivery streaming techniques including progressive download (PD) and dynamic adaptive streaming over HTTP (DASH).

Battery utilization may be improved by incorporating certain embodiments. Likewise, certain embodiments may reduce wastage of network resources. Furthermore, scalability of users for a given network condition can be improved using just in time delivery service techniques.

Certain embodiments can be applied to existing 3G and 4G radio network protocols. Moreover, certain embodiments can be transparent to an end user, and may not affect the existing quality of experience (QoE) metrics.

Thus, certain embodiments can create direct saving in terms of bandwidth by introducing just in time delivery techniques in the last hop, and minimizing the wastage of data. Moreover, certain embodiments can be applied to other types of streaming application in which duration of session are longer, and predictability of data is known based on the transaction, such as music streaming sessions.

Figure 5:
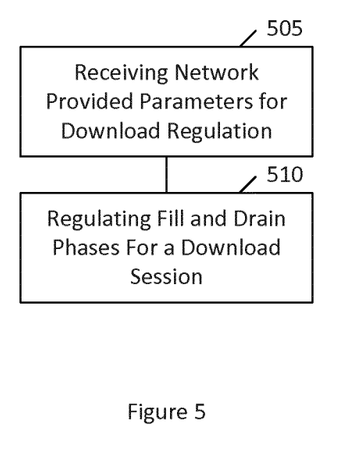
FIG. 5 illustrates a method according to certain embodiments.

FIG. 5 illustrates a method according to certain embodiments. As shown in FIG. 5, the method can include, at 510, regulating fill and drain phases for a downloading session to meet just in time delivery. The regulating can be performed by a user equipment based on parameters provided by a network, at 505.

Figure 6:
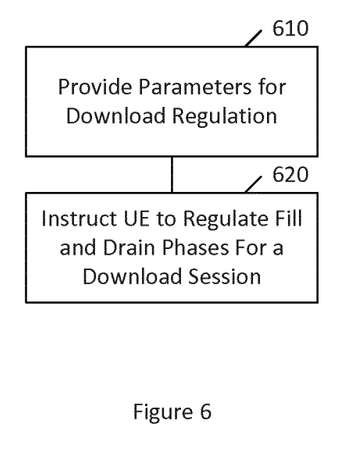
FIG. 6 illustrates another method according to certain embodiments.

FIG. 6 illustrates another method according to certain embodiments. As shown in FIG. 6, a method can include, at 610, providing parameters to a user equipment and, at 620, instructing the user equipment with respect to regulating fill and drain phases for a downloading session, to meet just in time delivery, based on the parameters.

Figure 7:
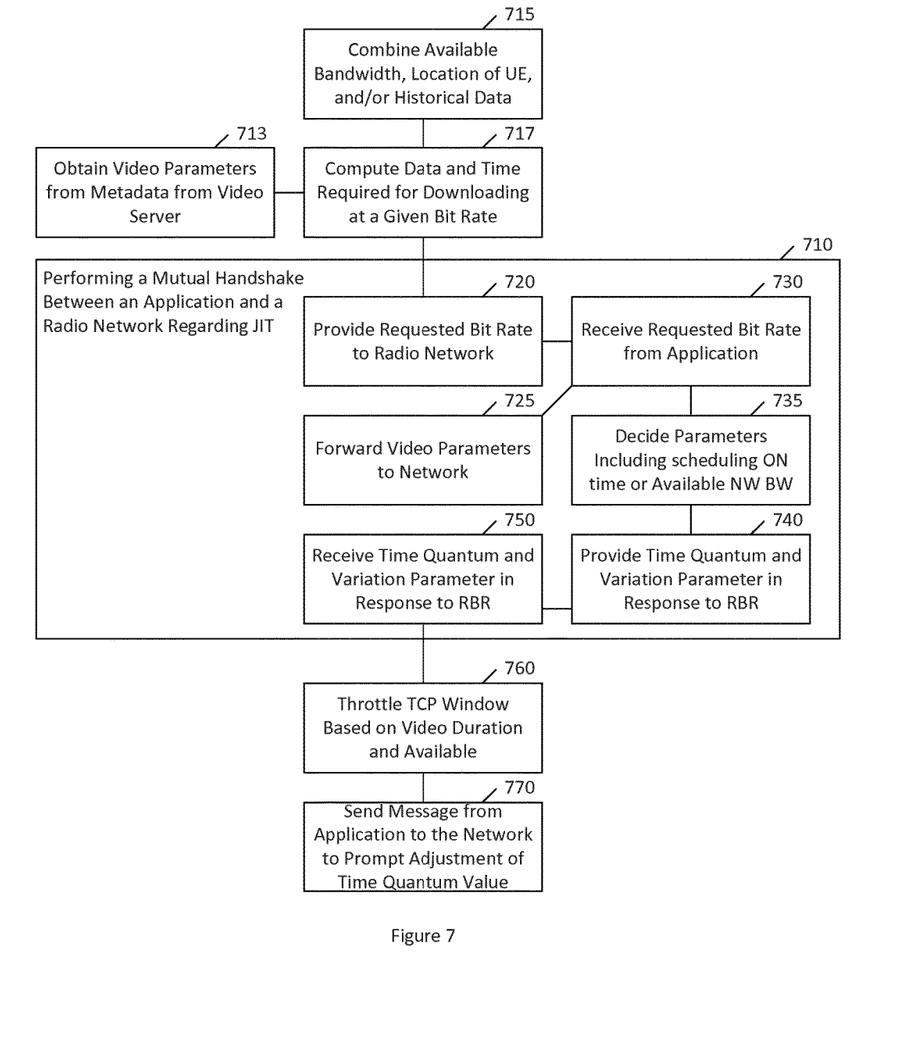
FIG. 7 illustrates a further method according to certain embodiments.

FIG. 7 illustrates a further method according to certain embodiments. The method can include, at 710, performing a mutual handshake between an application and a radio network regarding just in time delivery of a download.

The method can specifically include, at 720, providing a requested bit rate to the radio network and/or, at 730, receiving the requested bit rate from the application.

The method can additionally include, at 740, providing a time quantum and a variation parameter in response to the requested bit rate from the radio network and/or, at 750, receiving the time quantum and the variation parameter from the radio network at the application.

The method can further include, at 715, combining at least any two of available bandwidth, location of the user equipment, and historical information about throughput based on time or location, wherein just in time delivery is based on the combination.

The method can additionally include, at 760, throttling a transmission control protocol (TCP) window based on a video duration and available users on a network. The throttling can be performed directly at the user equipment.

The method can also include the application computing, at 717, how much data and time are required for downloading for a given bit rate, and determining appropriate network level parameters based on the computing. The network level parameters can include available bandwidth, requested bandwidth, and duration of access. The method can include, at 713, the application obtaining video parameters from metadata downloaded from a video server.

The method can further include, at 725, forwarding the video parameters to the network. The method can additionally include the network deciding, at 735, parameters including scheduling on time of radio resource or available network (NW) bandwidth (BW) for a video application.

The method can also include, at 770, sending a message from the application to the network, wherein the message is configured to prompt the network to adjust a time quantum value.

Figure 8:
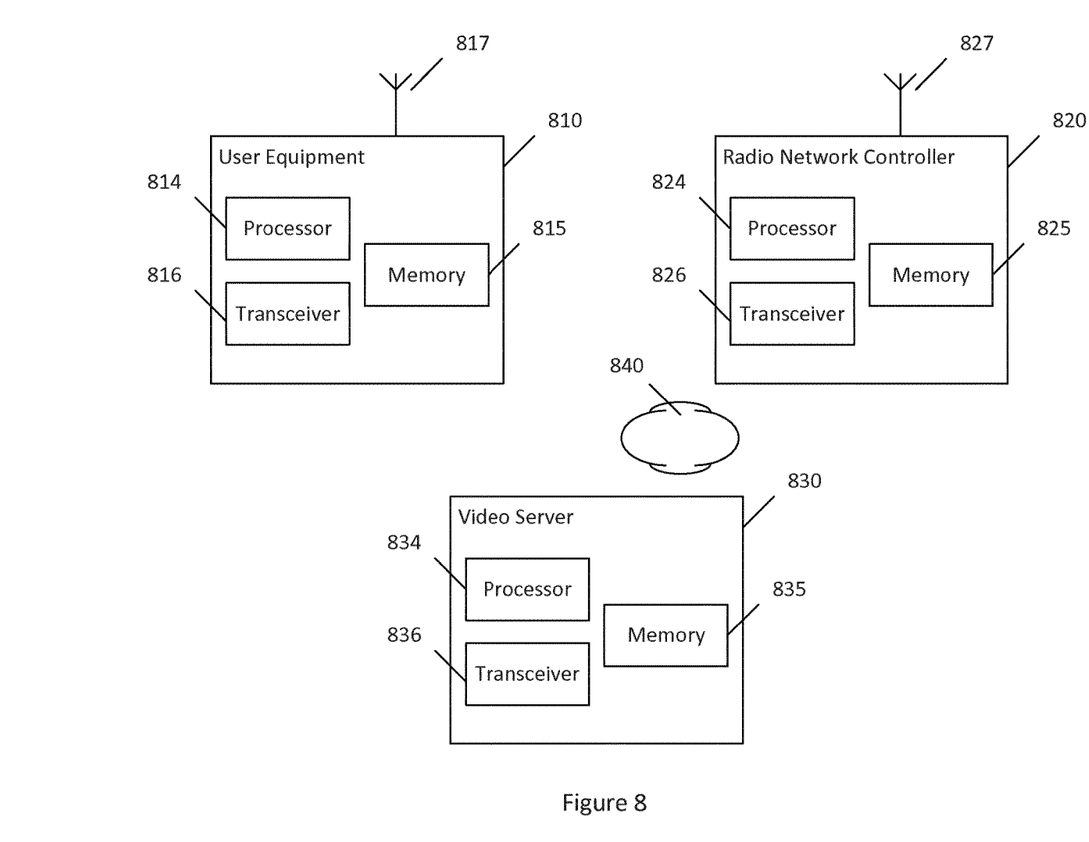
FIG. 8 illustrates a system according to certain embodiments of the invention.

FIG. 8 illustrates a system according to certain embodiments of the invention. In one embodiment, a system may comprise several devices, such as, for example, user equipment 810, radio network controller 820, and video server 830. The system may comprise more than one radio network controller, video server, and user equipment, although only one of each is shown for the purposes of illustration. See FIG. 2 for an example of an illustrative architecture.

Each of the devices in the system may comprise at least one processor, respectively indicated as 814, 824, and 834. At least one memory may be provided in each device, and indicated as 815, 825, and 835, respectively. The memory may comprise computer program instructions or computer code contained therein. One or more transceiver 816, 826, and 836 may be provided, and each device may also comprise an antenna, respectively illustrated as 817 and 827. Although only one antenna each is shown, many antennas and multiple antenna elements may be provided to each of the devices. Other configurations of these devices, for example, may be provided. For example, user equipment 810 and radio network controller 820 may be additionally or solely configured for wired communication, and in such a case antennas 817 and 827 may illustrate any form of communication hardware, without being limited to merely an antenna. For example, the video server 830 may be connected to the radio network controller 820 via an internet cloud 840, which may be a wired connection.

Transceivers 816, 826, and 836 may each, independently, be a transmitter, a receiver, or both a transmitter and a receiver, or a unit or device that may be configured both for transmission and reception.

Processors 814, 824, and 834 may be embodied by any computational or data processing device, such as a central processing unit (CPU), application specific integrated circuit (ASIC), or comparable device. The processors may be implemented as a single controller, or a plurality of controllers or processors.

Memories 815, 825, and 835 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors may be any suitable form of computer program code, for example, a compiled or interpreted computer program written in any suitable programming language.

The memory and the computer program instructions may be configured, with the processor for the particular device, to cause a hardware apparatus such as user equipment 810, radio network controller 820, and video server 830, to perform any of the processes described above (see, for example, FIGS. 2 to 7). Therefore, in certain embodiments, a non-transitory computer-readable medium may be encoded with computer instructions that, when executed in hardware, may perform a process such as one of the processes described herein. Alternatively, certain embodiments of the invention may be performed entirely in hardware.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

Glossary

3G Third Generation wireless networks
4G Fourth Generation wireless networks
JIT Just In Time
LTE Long Term Evolution
HTTP Hypertext transfer protocol
eNodeB evolved Node B
EPC Evolved Packet Core
RNC Radio Network Controller
NodeB 3G Base Station
UE User Equipment

We claim:

1. A method, comprising:
regulating fill and drain phases for a downloading session, to meet just in time delivery,
wherein the regulating is performed by a user equipment based on parameters provided by a network, the parameters comprising
a time quantum parameter setting a time period defining a fill phase during which the user equipment is to perform downloading, and
a variation parameter that defines
a first condition wherein the just in time delivery is not available, and conditions for the download is dependent on the user equipment and a video server application,
a second condition wherein the user equipment implements fair policy network usage, and a third condition wherein the user equipment uses the time period of the time quantum parameter to a maximum possible potential to download as much as possible during the time period, and wherein the just in time delivery is based on a combination of available bandwidth, location of the user equipment, and historical information about throughput based on time or location.

2. A method, comprising:

a network providing parameters to a user equipment; and instructing the user equipment with respect to regulating fill and drain phases for a downloading session, to meet just in time delivery, based on the parameters, the parameters comprising     a time quantum parameter setting a time period defining a fill phase during which the user equipment is to perform downloading, and     a variation parameter that defines         a first condition wherein the just in time delivery is not available, and conditions for the download is dependent on the user equipment and a video server application,         a second condition wherein the user equipment implements fair policy network usage, and         a third condition wherein the user equipment uses the time period of the time quantum parameter to a maximum possible potential to download as much as possible during the time period, wherein the just in time delivery is based on a combination of available bandwidth, location of the user equipment, and historical information about throughput based on time or location.

3. A method, comprising:

performing a mutual handshake between an application of a user equipment and a radio network regarding just in time delivery of a download, with there being an exchange of messages between the user equipment and the radio network; and combining available bandwidth, location of the user equipment, and historical information about throughput based on time or location, wherein the download is performed based on     a time quantum parameter setting a time period defining a fill phase during which a user equipment is to perform downloading, and     a variation parameter that defines         a first condition wherein the just in time delivery is not available, and conditions for the download is dependent on the user equipment and a video server application,         a second condition wherein the user equipment implements fair policy network usage, and         a third condition wherein the user equipment uses the time period of the time quantum parameter to a maximum possible potential to download as much as possible during the time period, and wherein the just in time delivery is based on the combination.

4. The method of claim 3, further comprising:

the user equipment providing a requested bit rate to the radio network; and/or the network receiving the requested bit rate from the application.

5. The method of claim 4, further comprising:

providing the time quantum parameter and the variation parameter in response to the requested bit rate from the radio network; and/or receiving the time quantum and the variation parameter from the radio network at the application.

6. The method of claim 3, further comprising:

throttling a transmission control protocol (TCP) window based on a video duration and available users on a network, wherein the throttling is performed directly at the user equipment.

7. The method of claim 3, further comprising:

computing, by the application, how much data and time are required for downloading for a given bit rate; and determining appropriate network level parameters based on the computing, wherein the network level parameters include available bandwidth, requested bandwidth, and duration of access.

8. The method of claim 3, further comprising:

obtaining, by the application, video parameters from metadata downloaded from a video server.

9. The method of claim 8, further comprising:

forwarding the video parameters to the network.

10. The method of claim 3, further comprising:

deciding, by the network, parameters including scheduling on time of radio resource or available network bandwidth for a video application.

11. The method of claim 3, further comprising:

sending a message from the application to the network, wherein the message is configured to prompt the network to adjust a time quantum value.

12. An apparatus, comprising:

a processor; and a memory including computer program code, wherein the memory and the computer program code are configured to, with the at least one processor, cause that apparatus at least to regulate fill and drain phases for a downloading session based on parameters provided by a network, to meet just in time delivery, the parameters comprising     a time quantum parameter setting a time period defining a fill phase during which the user equipment is to perform downloading, and     a variation parameter that defines         a first condition wherein the just in time delivery is not available, and conditions for the download is dependent on the user equipment and a video server application,         a second condition wherein the user equipment implements fair policy network usage, and         a third condition wherein the user equipment uses the time period of the time quantum parameter to a maximum possible potential to download as much as possible during the time period, wherein the apparatus comprises a user equipment, and wherein the just in time delivery is based on a combination of available bandwidth, location of the user equipment, and historical information about throughput based on time or location.

13. An apparatus, comprising:

a processor; and a memory including computer program code, wherein the memory and the computer program code are configured to, with the at least one processor, cause that apparatus at least to providing parameters to a user equipment; and instructing the user equipment with respect to regulating fill and drain phases for a downloading session, to meet just in time delivery, based on the parameters, the parameters comprising a time quantum parameter setting a time period defining a fill phase during which the user equipment is to perform downloading, and
a variation parameter that defines
a first condition wherein the just in time delivery is not available, and conditions for the download is dependent on the user equipment and a video server application,
a second condition wherein the user equipment implements fair policy network usage, and
a third condition wherein the user equipment uses the time period of the time quantum parameter to a maximum possible potential to download as much as possible during the time period,
wherein the just in time delivery is based on a combination of available bandwidth, location of the user equipment, and historical information about throughput based on time or location.

14. An apparatus, comprising:
a processor; and
a memory including computer program code,
wherein the memory and the computer program code are configured to, with the at least one processor, cause that apparatus at least to
perform a mutual handshake between an application of a user equipment and a radio network regarding just in time delivery of a download, with there being an exchange of messages between the user equipment and the radio network, and
combine available bandwidth, location of the user equipment, and historical information about throughput based on time or location,
wherein the download is performed based on
a time quantum parameter setting a time period defining, and
a variation parameter that defines
a first condition wherein the just in time delivery is not available, and conditions for the download is dependent on the user equipment and a video server application,
a second condition wherein the user equipment implements fair policy network usage, and
a third condition wherein the user equipment uses the time period of the time quantum parameter to a maximum possible potential to download as much as possible during the time period, and
wherein the just in time delivery is based on the combination.

15. The apparatus of claim 14, wherein the memory and the computer program code are configured to, with the at least one processor, cause that apparatus to
provide a requested bit rate to the radio network.

16. The apparatus of claim 15, further comprising:
provide the time quantum parameter and the variation parameter in response to the requested bit rate from the radio network; and/or
receive the time quantum and the variation parameter from the radio network at the application.

17. The apparatus of claim 14, wherein the memory and the computer program code are configured to, with the at least one processor, cause that apparatus at least to throttle a transmission control protocol (TCP) window based on a video duration and available users on a network, wherein the throttling is performed directly at the user equipment.

18. The apparatus of claim 14, wherein the memory and the computer program code are configured to, with the at least one processor, cause that apparatus at least to:
compute, by the application, how much data and time are required for downloading for a given bit rate; and
determine appropriate network level parameters based on the computing,
wherein the network level parameters include available bandwidth, requested bandwidth, and duration of access.

19. The apparatus of claim 14, wherein the memory and the computer program code are configured to, with the at least one processor, cause that apparatus at least to obtain, by the application, video parameters from metadata downloaded from a video server.

20. The apparatus of claim 19, wherein the memory and the computer program code are configured to, with the at least one processor, cause that apparatus at least to forward the video parameters to the network.

21. The apparatus of claim 14, wherein the memory and the computer program code are configured to, with the at least one processor, cause that apparatus at least to decide, by the network, parameters including scheduling on time of radio resource or available network bandwidth for a video application.

22. The apparatus of claim 14, wherein the memory and the computer program code are configured to, with the at least one processor, cause that apparatus at least to send a message from the application to the network, wherein the message is configured to prompt the network to adjust a time quantum value.

23. A non-transitory computer-readable medium encoded with instructions that, when executed in hardware, perform the method according to claim 1.

* * * * *